United States Patent [19]
Romeo

[11] Patent Number: 5,987,206
[45] Date of Patent: Nov. 16, 1999

[54] METHOD AND APPARATUS FOR SEPARATING OPTICAL FIBERS IN A MULTIPLE-FIBER CABLE

[75] Inventor: Rocco Romeo, Scotch Plains, N.J.

[73] Assignee: Lucent Technologies Inc., Murray Hill, N.J.

[21] Appl. No.: 08/918,938

[22] Filed: Aug. 28, 1997

[51] Int. Cl.[6] ........................................ G02B 6/00
[52] U.S. Cl. .................................................. 385/134
[58] Field of Search .................... 385/134, 59, 102–114, 385/45

[56] References Cited

U.S. PATENT DOCUMENTS 4,118,618  10/1978  Gauthier et al. ...................... 219/121 P
5,530,782   6/1996  Osaka et al. ............................. 385/45

*Primary Examiner*—Rodney Bovernick
*Assistant Examiner*—Ellen E. Kang
*Attorney, Agent, or Firm*—Mathews, Collins, Shepherd & Gould, P.A.

[57] ABSTRACT

A method and apparatus for separating optical fibers contained in a multiple-fiber cable is disclosed. The method has particular application for separating long cables, that is, of about ten centimeters or more, of the type having a king wire and a plurality of fibers concentrically arranged around the king wire and embedded in a matrix material. The method involves stringing the cable in a taut position and moving a separation mold between the fibers and along the length of the cable while applying heat to the cable.

20 Claims, 5 Drawing Sheets

METHOD AND APPARATUS FOR SEPARATING OPTICAL FIBERS IN A MULTIPLE-FIBER CABLE

This invention was made with government support. The United States government has certain rights in this invention.

FIELD OF THE INVENTION

This invention relates to a method and apparatus for separating optical fibers contained in a multiple-fiber cable, and more particularly, to a method and apparatus for separating fibers from an elongated cable of the type having a king wire and a matrix material in which the fibers are embedded.

BACKGROUND OF THE INVENTION

In a typical multi-fiber optical cable, four or more optical fibers are arranged in a concentric array around a steel "king" wire and embedded in a polymeric matrix material (e.g., nylon). At times one may desire to separate the individual fibers from the cable. Traditionally, one common method of separating the fibers involves using a hot air gun to soften the nylon (or other matrix material) in which the fibers are embedded; the fibers are then withdrawn by separately pulling each fiber from the material. With this procedure, fiber breakage is a common occurrence, particularly when relatively long sections of cable are being separated, for example, cable sections of ten (10) centimeters or longer. The longer the optical cable, the greater the likelihood there is that the fibers will break when an attempt is made to separate them.

The instant invention is therefore addressed to providing an improved method of separating fiber optic cables from a polymeric matrix material that reduces the risk of breaking the fibers, while also increasing the speed of the method, and an apparatus for performing this method. The nature, advantages, and various additional features of the invention will appear more fully upon consideration of the illustrative embodiments described in detail below in connection with the accompanying drawings.

SUMMARY OF THE INVENTION

Summarily described, the invention embraces a method of separating optical fibers from a cable involving the steps of providing a separation mold and moving the mold between the fibers of the cable while applying heat to the cable. More particularly, the steps of the method comprise separating the plurality of fibers from the matrix material over a fraction of the length of the cable to define a flared starting point; securing the cable so it is held taut between a first position and a second position with the flared starting point disposed between the first and second positions; placing a mold between the fibers at the flared starting point and aligning the fibers on the surface of the mold; and moving the mold between the first position and the second position while heating the cable adjacent the mold so that the matrix material is softened and the fibers are separated and guided to slide over the surface of the mold.

In a preferred embodiment, the mold is cone-shaped with a plurality of channels on its outer surface, and it is positioned so that the apex of the cone points in the direction of movement of the mold during the separation process. The invention further comprises an apparatus for carrying out this method.

BRIEF DESCRIPTION OF THE DRAWINGS

For a better understanding of the invention, an exemplary embodiment is described below, considered together with the accompanying drawings, in which.

It is to be understood that these drawings are for purposes of illustrating the concepts of the invention and are not to scale.

DETAILED DESCRIPTION OF THE INVENTION

Figure 1:
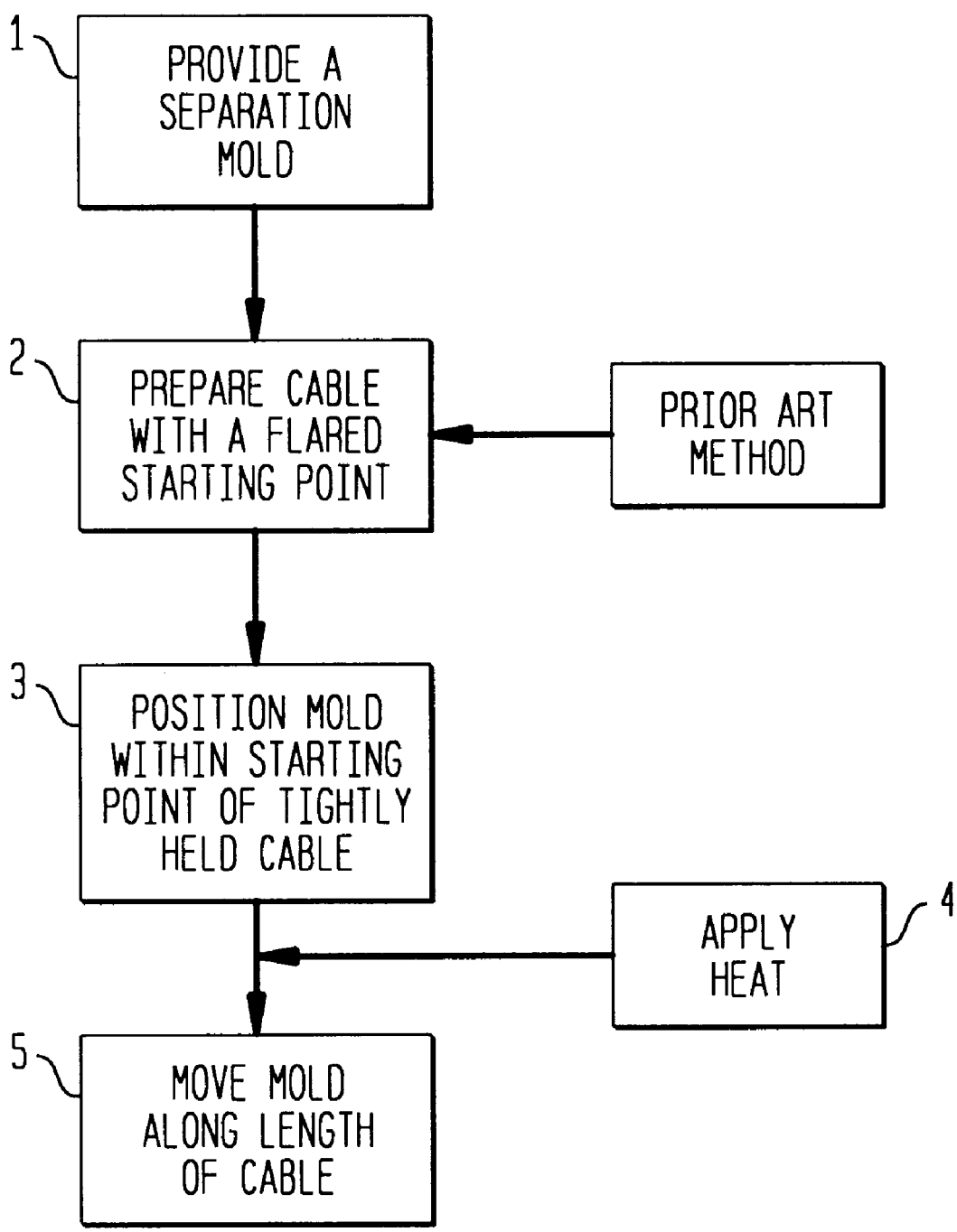
FIG. 1 is a block diagram listing the steps of the instant invention method.

Referring to FIG. 1, there is shown a block diagram of the steps of the instant invention method. As noted in block 1, a separation mold is provided. This mold is used to separate the fibers of the cable from the king wire and matrix material, as will be later explained. A preferred embodiment for the separation mold is depicted in FIGS. 2A, 2B, and 2C.

Figure 2A:
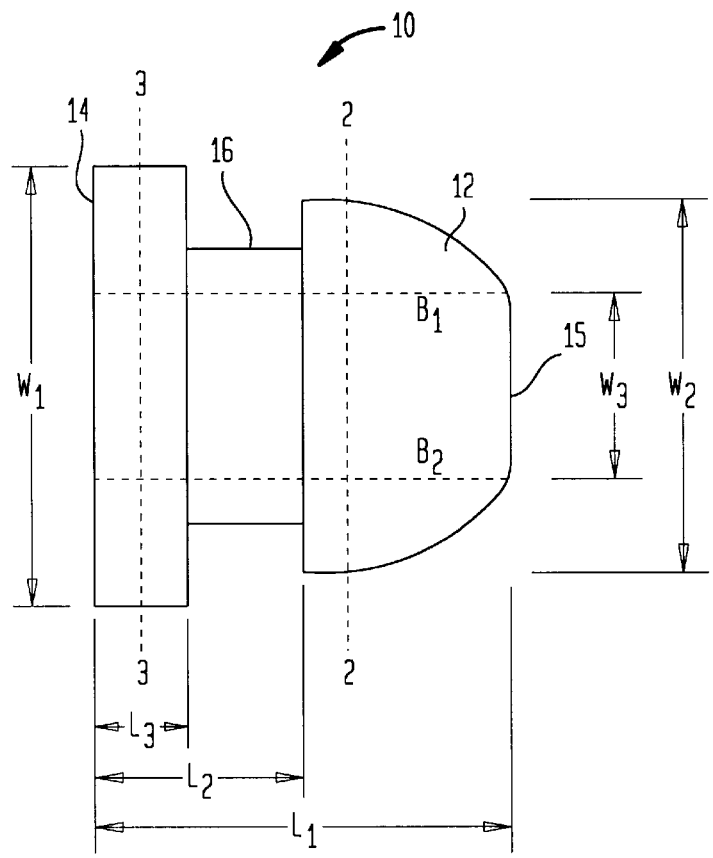
FIG. 2A shows a side-view of a preferred embodiment for the mold for performing the present invention method.

Referring to FIG. 2A, there is shown a side view of a mold 10 which is generally cone-shaped, having an apex portion 12 and a base portion 14. The mold can be fabricated with any material that will allow for the optical fibers to slide over its outer surface; the outer surface of the mold 10 is advantageously curved. The surface of the mold also preferably has a middle recessed area 16, which aids in reducing friction as the optical fibers slide over the surface of the mold. The mold has an internal bore 15 which traverses the length of the mold from the apex portion 12 through the base portion 14; the bore 15 is reflected by the horizontal hatched lines B1, B2, and allows for the threading of the "king" wire and matrix material through the mold.

The preferred size and dimensions of the mold naturally will depend upon the fiber optic cable being separated. However, for traditional fiber optic cables containing four optical fibers, the length of the mold L1 is preferably about 1.120 inches. The length L2 reflecting the distance between the outermost edge of the mold at the base portion 14 to the proximal edge of the apex portion 12 is preferably about 0.56 inches; and the length L3 reflecting the length of the base portion 14 is about 0.25 inches. The width W1 of the mold at the base portion, the widest portion of the mold, is about 1.19 inches; the width W2 of the mold reflecting the widest diameter of the apex portion is about 1.0 inches; and the width W3 of the bore is about 0.5 inches. The width W3 of the bore must be wide enough to prevent the softened matrix material from coming in contact with the mold. It is understood that these dimensions are approximations.

Figure 2B:
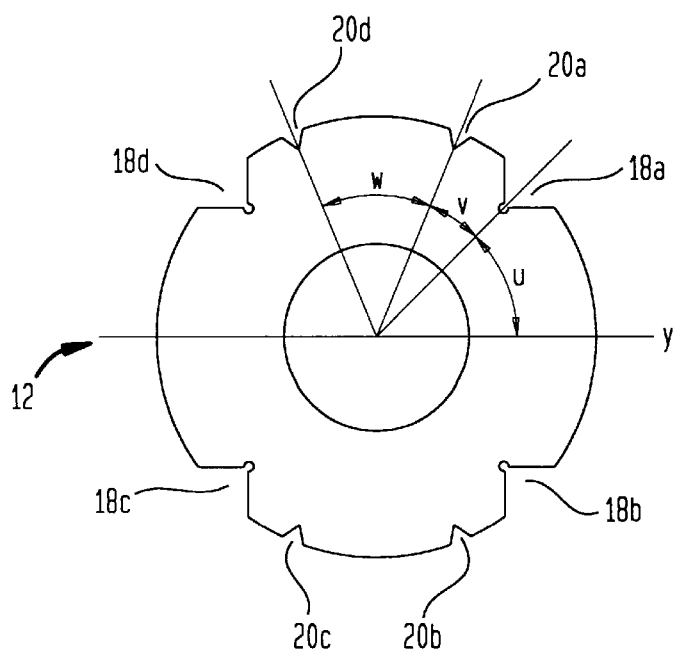
FIG. 2B shows a cross-sectional view of the mold taken along the line 2—2 of FIG. 2A.
Figure 2C:
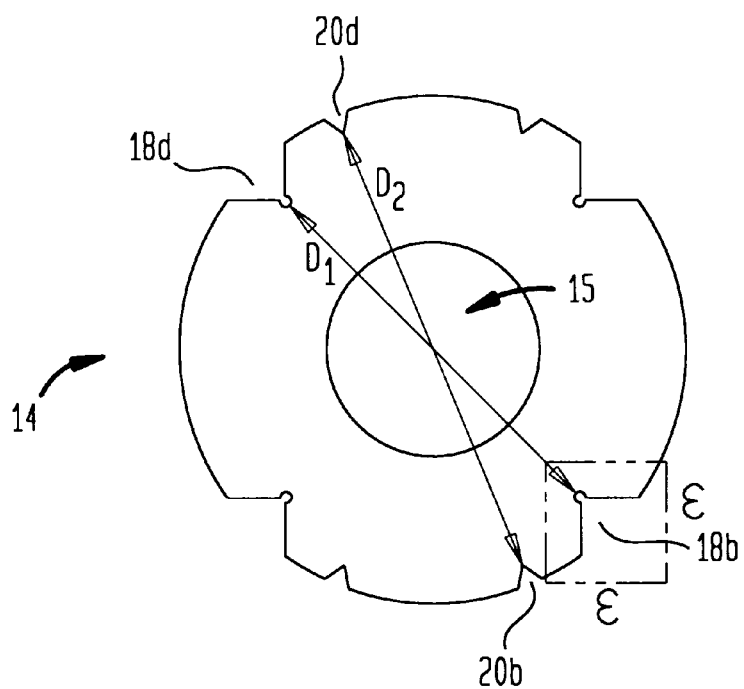
FIG. 2C shows a cross-sectional view of the mold taken along the line 3—3 of FIG. 2A.
Figure 2D:
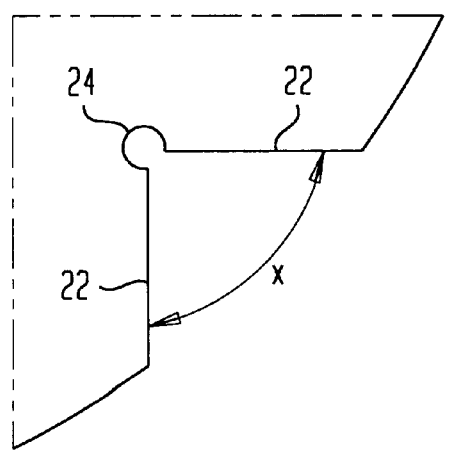
FIG. 2D shows an exploded cross-sectional view of a section of the mold at the boxed region E—E of FIG. 2C.

Referring to FIGS. 2B and 2C, which show cross-sectional views along the lines 2—2 and 3—3 of FIG. 2A, respectively, it can be seen that both the apex portion 12 and the base portion 14 have a plurality of sliding channels 18a, 18*b*, 18*c*, 18*d*, and a plurality of parking grooves 20*a*, 20*b*, 20*c*, and 20*d*. The channels and grooves on the apex portion 12 (FIG. 2B), correspond in dimension and orientation with the channels and grooves on the base portion 14 (FIG. 2C). The sliding channels 18*a*, 18*b*, 18*c*, 18*d*, have a generally triangular cross-section, with two inwardly slanting sides 22 that terminate in an arcuate vertex 24, with an angle x disposed between the sides 22 of about ninety degrees. The arcuate vertex 24 retains the optical fiber in the channel and provides a curved surface over which the fiber may slide.

Referring to FIG. 2B, there is shown preferred angles for orientation of the channels (18*a–d*) and grooves (20*a–d*) relative to a central horizontal axis y. The angle u between the axis y and the midpoint of the proximal channel 18*a* is preferably about forty-five (45) degrees; the angle v between the midpoint of the channel 18*a* and the midpoint of the parking groove 20*a* is preferably about twenty (20) degrees; and the angle w between the midpoint of the parking groove 20*a* and the midpoint of the parking groove 20*d* is preferably about forty (40) degrees. Corresponding dimensions preferably should be used for the remaining sliding channels 18*b*, 18*c*, 18*d*, and parking grooves 20*b*, 20*c*, relative to the central axis y. Referring to FIG. 2C, the diameter D1 between the vertices of diagonally corresponding channels 18*b*, 18*d* is about 1.0 inch; and the diameter D2 between the vertices of diagonally corresponding grooves 20*b*, 20*d* is about 1.120 inches.

Referring again to the block diagram of FIG. 1, once a suitable mold has been provided, the cable needs to be prepared for the separation process. The fibers of the cable need to be separated to provide a flared starting point (FIG. 1, block 2). This step may be performed by traditional methods of separating fiber optic cables, such as with the use of a heat gun, tapered stripping tool, or manual separation. However, the manual separation is only needed for a relatively short section of the cable, to provide a starting point. Thus, the risk of breakage is small. Preferably, when a mold having the dimensions mentioned above is used, the fibers of the cable are advantageously manually separated for a length of about eight inches, and about two inches of the steel "king" wire should be exposed to aid in attaching the "king" wire to the tension rod, as will be further explained. However, the important consideration in providing the starting point is to separate a sufficient length of cable to enable one to place the fibers over the mold being used.

Figure 3:
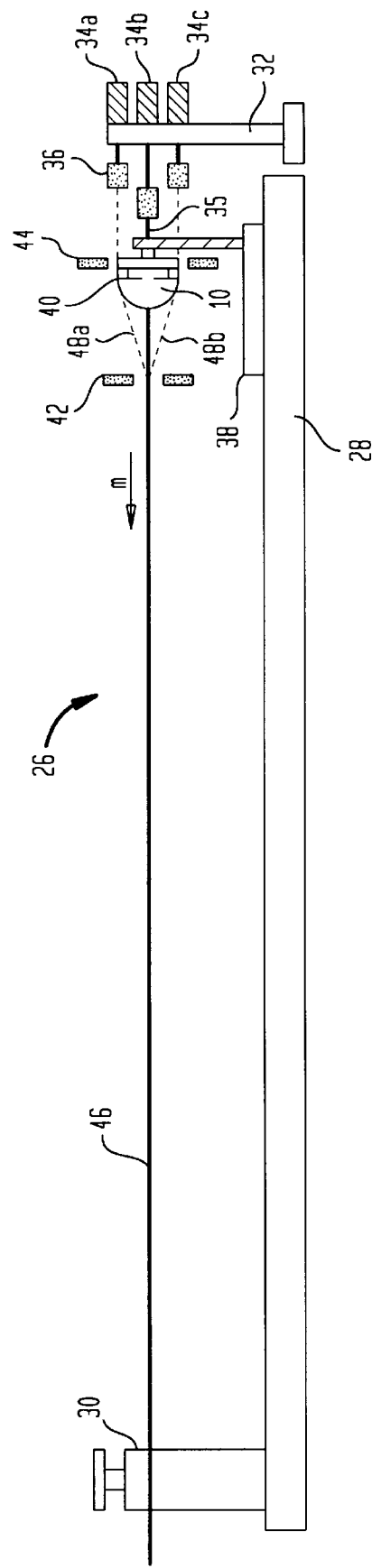
FIG. 3 shows a cross-sectional side view of a preferred embodiment of the present-invention apparatus.
Figure 3A:
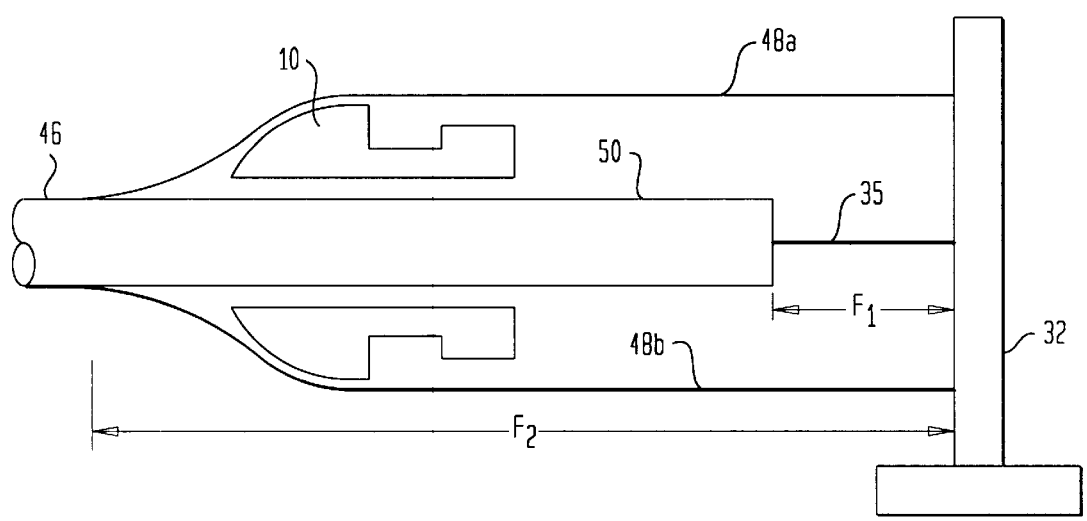
FIG. 3A shows a cross-sectional view of the mold illustrating a method for disposing the fibers on the mold and present invention apparatus.

Once the flared starting point is provided, the mold is placed between the separated fibers at that point, and the cable is held in a taut position (or strung between two points) (FIG. 2, block 3). FIG. 3 shows a preferred apparatus for positioning the mold and cable, along with the cable 46, and FIG. 3A shows a preferred method for placing the fibers on the mold at the flared starting point. The flared started point has been provided, so in FIGS. 3 and 3A, the king wire 35 and two optical fibers 48*a*, 48*b*, are exposed. The apparatus 26 has a long base 28. A cable clamp 30 is disposed at one end of the base 12, and a tension support stand 32 is at the other end. The tension support stand 32 has a plurality of spring-loaded tension rods 34*a*, 34*b*, 34*c*, for holding the king wire and individual fibers of the cable with tension. Preferably, there should be one spring-loaded tension rod for each optical fiber being separated, and a centrally-disposed tension rod 34*b* for retaining the steel "king" wire 35. The "king" wire 35 should be held at a higher tension than the fibers 48*a*, 48*b*. The support stand 32 also may have a plurality of alligator clips 36 to aid in securing the fibers and wire to the tension support stand 32. Preferably, there should be one alligator clip 36 corresponding to each one of the tension rods 34, the alligator clips 36 and corresponding tension rods 34 being aligned on opposing surfaces of the tension support stand 32.

Referring now to FIG. 3A, the fibers 48*a*, 48*b*, and cable 46 are shown placed over the mold and attached to the tension support rod 32. (The fibers 48*a*, 48*b* are shown displaced from the mold for illustrative purposes, and the clips 36 and tension rods 34 are not shown.) The flared starting point has been provided, with the "king" wire 35 exposed. In providing the flared starting point, the distance F1 at which the "king" wire is exposed is preferably about two inches. The distance F2, reflecting the length at which the fibers are separated from the cable, is preferably about eight inches. The polymeric matrix material 50 is inserted through the bore of the mold 10, along with the exposed "king" wire, but it should not come in contact with the mold 10.

Referring now to FIG. 3, a slidable platform 38 is disposed on the base 28. The platform 38 is slidable relative to the base 28, and moves between the clamp 30 and the tension support stand 32. On the platform 38 is mounted a flaring apparatus 40, which comprises a heater 42 and the mold 10. The heater 42 is preferably a toroidal electric heater which is suitably configured to substantially encircle the fiber optic cable being separated. A second optional heater 44 also may be provided at the base of the mold to heat the mold and enhance the separating process. A motor and drive assembly (not shown) is disposed adjacent the base 12 for automatically moving the platform 38 and flaring apparatus 40 relative to the base 28 and cable 46.

Referring still to FIG. 3, the mold 10 and cable 46 are positioned (FIG. 1, block 3), by stringing the cable between the clamp 30 and tension support stand 32; the cable is held in a taut position at one end or point to the clamp 30 and at the other end to the stand 32. At the point where the cable is annexed to the clamp, the polymeric matrix skin may be removed from the cable. This may be done by slitting the cable, i.e., up to one-half inch from the clamp, with a nylon slitting tool. The skin can be carefully peeled off in the direction of the clamp and cut off. In securing the cable 46 to the tension support rod 32, the steel king wire 35 may be fed through the bore 15 of the mold and then clamped onto a tension rod 34*b* and clipped with an alligator clip 36. One should at this point verify that the cable and the optical fibers inside the matrix are placed under tension. Also, the cable should be orientated so that there is no helical twist of the fibers around the king wire and so that each fiber 48*a*, 48*b*, is inserted in a channel (FIG. 2B, 18*a–d*), on the mold. Each fiber then should be inserted into a tension rod 34*a*, 34*c*.

Once the mold 10 has been placed within the flared starting point of the tautly-held cable 46, the separation process may proceed (FIG. 1, blocks 4, 5). The heater 42 (FIG. 3), is turned on to apply heat to the cable. Preferably, the heater 42 has a temperature controller which is advantageously set for 375 degrees Fahrenheit when fiber optic cables with nylon matrix material are used. It is contemplated that other temperatures may be used as well, depending on the matrix of the fiber optic cable. It is also advantageous to pre-heat the mold 10 for about five minutes, for example, by using the second heater 44, and then turning it off prior to commencing the separation process.

Once the heaters reach the desired operating temperature, the platform 38 and associated flaring apparatus 40 are activated to move along the length of the cable toward the clamp 30, i.e., in the direction of arrow M of FIG. 3. The rate of movement is preferably about one inch for every thirty-five seconds. As the flaring apparatus 38 moves, fresh cable passes through the heater 42, which softens the matrix material. The tension on the cable and the fibers, together with the movement of the flaring apparatus, guides the optical fibers to move over the outer surface of the mold (48*a*, 48*b*). The process should be carefully observed to ensure that the king wire 35 and fibers 48*a*, 48*b*, remain under tension. The platform 38 may be stopped and restarted, as needed, to ensure that the tension in the fibers and wire is maintained.

Once the flaring apparatus has slid to the desired point for separating the cable, the movement of the flaring apparatus is stopped, and the fibers are removed from the apparatus.

Preferably, once the separation process is completed, the heaters are deactivated; the fibers are quickly positioned into the parking grooves of the mold; the components are allowed to cool, i.e., for about two minutes; the fibers are removed from the tension rods; and the flaring apparatus is returned to its starting position. The fibers should be carefully supported after release from the tension rods to avoid damage. The king wire may be cut away from the clamp 30, i.e., about two and one-half inches from the face. A tapered stripping cone may be used to remove the ends of the separated fibers from the king wire, i.e., to within three-quarters of an inch from the face of the clamp 30.

It will be understood that the embodiments described herein are merely exemplary and that a person skilled in the art may make variations and modifications without departing from the spirit and scope of the invention. All such variations and modifications are intended to be included within the scope of the appended claims.

I claim:

1. A method for separating a plurality of fibers from an elongated cable of the type having a king wire and a matrix material in which the plurality of fibers are embedded, the method comprising the steps of:
   (a) providing a mold movable between a first position and a second position, the mold having a surface that is configured so that the plurality of fibers of the cable may slide over the surface of the mold in spaced-apart relation;
   (b) separating the plurality of fibers from the matrix material over a fraction of the length of the cable to define a flared starting point, the flared starting point being sized in length to permit placement of the mold between the fibers;
   (c) securing the cable so it is held taut between the first position and the second position with the flared starting point disposed between the first and second positions;
   (d) placing the mold between the fibers at the flared starting point and aligning the fibers on the surface of the mold; and
   (e) heating the cable adjacent the mold to soften the matrix material and moving the mold between the first position and the second position so that the fibers are separated and slide over the surface of the mold.

2. The method according to claim 1, in which the flared starting point is at one end of the cable, and further comprising the step of securing the ends of the plurality of fibers at the flared starting point to a plurality of tension support rods.

3. The method according to claim 1, in which the cable is heated simultaneously as the mold is moved between the first position and the second position.

4. The method according to claim 1, further comprising the step of heating the mold.

5. The method according to claim 1, in which the mold is cone-shaped and is disposed so that the apex of the cone points in the direction of movement of the mold as the fibers are separated.

6. The method according to claim 1, in which the surface of the mold has a plurality of channels for retaining the plurality of fibers, and wherein the step of aligning the fibers on the surface of the mold comprises placing the fibers in the channels.

7. The method according to claim 6, in which the surface of the mold further has a plurality of parking grooves for retaining the fibers in a substantially fixed position when movement of the mold is discontinued.

8. The method according to claim 1, in which the mold has an internal bore, and further comprising the step of threading the king wire of the cable through the internal bore.

9. The method according to claim 1, further comprising the steps of providing an elongated base disposed between the first position and the second position, coupling a platform to the base that is slidable over the length of the base, and securing the mold to the platform.

10. An apparatus for separating a plurality of fibers from an elongated cable of the type having a king wire and a matrix material in which the plurality of fibers are embedded, the apparatus comprising:
    means for securing the cable at a first position of the cable and means for securing the cable at a second position of the cable so that the cable may be tautly strung between the first and second positions;
    a mold movable between the first position and the second position, the mold having a surface that is configured so that the fibers of the cable may slide over the surface of the mold in spaced-apart relation; and
    a heating means disposed adjacent the mold and movable with movement of the mold wherein as the mold moves between the first position and the second position, the heating means softens the matrix material to release the fibers and the mold guides the fibers to slide over the surface of the mold in spaced-apart relation.

11. The apparatus according to claim 10, in which the means for securing the cable at the first position comprises at least one spring-loaded tension rod and the means for securing the cable at the second position comprises a clamp.

12. The apparatus according to claim 11, further comprising a plurality of spring-loaded tension rods at the first position for holding each of the plurality of fibers of the cable in a taut position.

13. The apparatus according to claim 12, further comprising an elongated base disposed between the first position and the second position and a platform disposed on the elongated base for coupling the mold to the base, wherein the platform is slidable relative to the base for providing movement of the mold.

14. The apparatus according to claim 13, further comprising a support stand for holding the plurality of spring-loaded tension rods.

15. The apparatus according to claim 10, in which the heating means comprises an electric heater that is configured to substantially encircle the cable at a pre-determined fraction of its length.

16. The apparatus according to claim 10, in which the heating means comprises a plurality of electric heaters.

17. The apparatus according to claim 10, in which the mold is cone-shaped and is disposed so that the apex of the cone points in the direction of movement of the mold as the fibers are separated.

18. The apparatus according to claim 10, in which the surface of the mold has a plurality of channels for retaining the plurality of fibers on the surface of the mold.

19. The apparatus according to claim 10, in which the surface of the mold further has a plurality of parking grooves for retaining the fibers in a substantially fixed position when movement of the mold is discontinued.

20. The apparatus according to claim 10, in which the mold has an internal bore for threading the king wire of the cable through the mold.

* * * * *